Figure 1:
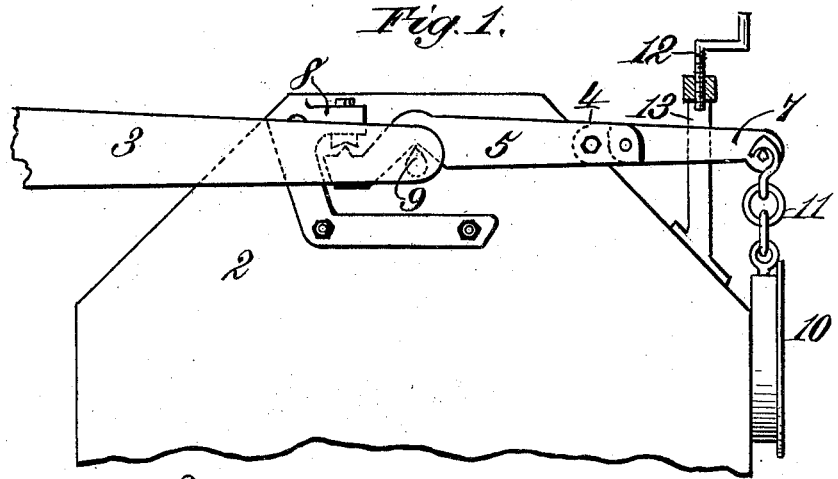

No. 828,246. PATENTED AUG. 7, 1906.
H. RICHARDSON.
WEIGHING MACHINE.
APPLICATION FILED NOV. 23, 1905.

Witnesses.
Robert Everett.
Ernest E. Weaver.

Inventor:
Henry Richardson.
By James L. Norris.
Atty

UNITED STATES PATENT OFFICE.

HENRY RICHARDSON, OF NEW YORK, N. Y.

WEIGHING-MACHINE.

No. 828,246. Specification of Letters Patent. Patented Aug. 7, 1906.

Application filed November 23, 1905. Serial No. 288,739.

*To all whom it may concern:*

Be it known that I, HENRY RICHARDSON, a subject of the King of Great Britain, residing at New York, in the county of New York and State of New York, have invented new and useful Improvements in Weighing-Machines, of which the following is a specification.

This invention relates to weighing - machines.

My invention is primarily adapted for use in conjunction with automatic scales, although of course it may be employed in other connections; and its object is to secure an accurate record of fractions of loads in a simple expeditious manner.

In automatic weighing-machines as ordinarily constructed it is necessary in order to determine the weight of a partial load to manipulate the load-counterweights by taking them off and putting them on their carrier hung from the beam until the fractional load is counterbalanced. This, as will be obvious, is a laborious and time-requiring operation. By reason of my construction I can secure an automatic indication of a fractional load.

In the drawings accompanying and forming a part of this specification I illustrate a simple form of embodiment of the invention which to enable those skilled in the art to practice said invention I will set forth in detail in the following description, while the novelty of said invention will be included in the claims succeeding said description.

Figure 2:
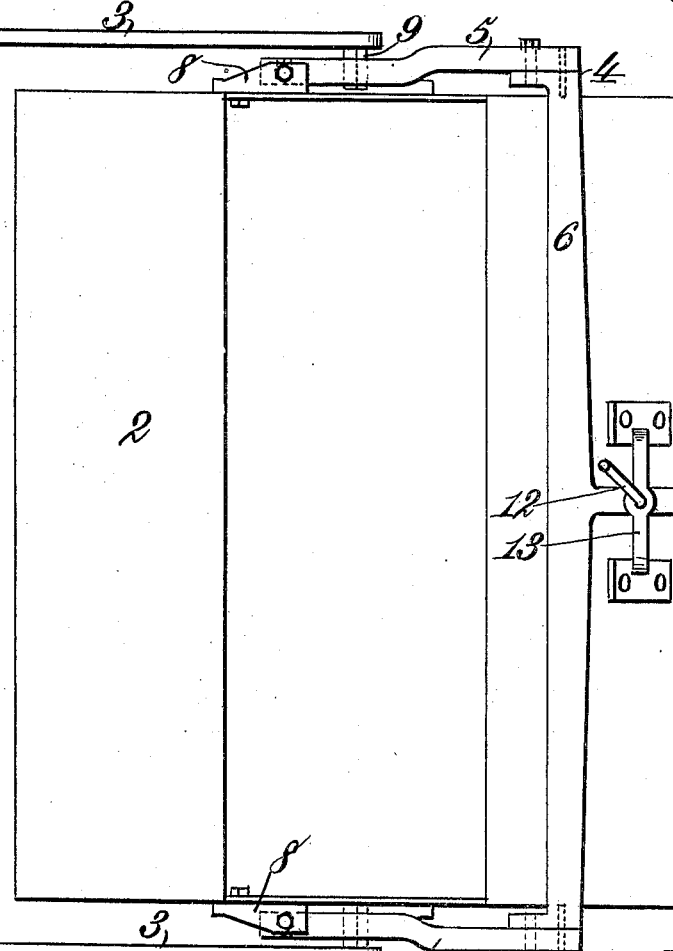
Figure 3:
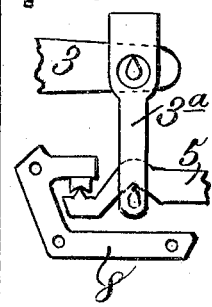

In the drawings, Figure 1 is a side elevation with a part in section of a portion of a weighing-machine involving my invention. Fig. 2 is a top plan view of the parts shown in the preceding figure. Fig. 3 is a detail view of a modification hereinafter more particularly described.

Like characters refer to like parts throughout the several views.

In the drawings I show in part certain elements of a weighing mechanism which I will briefly set forth for the reason that in themselves they do not constitute a part of the invention. One of these elements is a bucket or weighing-hopper and another is a beam. The bucket or weighing-hopper may be any of the several types in successful operation, while the same applies to the beam.

The bucket represented is denoted in a general way by 2, and the beam by 3. I will term the beam 3 a "main" beam, for in the form of embodiment of the invention illustrated I employ an auxiliary beam, as 4.

The bucket 2 represented is of the rising-and-falling type as contradistinguished from the class that tilts to effect the discharge of a load. From what has been previously stated, however, it will be understood that the bucket may be of any desirable character. The main beam 3 has complemental bucket-supporting arms arranged at the inner side of its fulcrum or center of motion, as is the custom and, as for example, as illustrated by Letters Patent No. 760,485, granted to me May 24, 1904. From the outer side of the beam 3, which outer side, however, is not illustrated, is suspended the counterbalance means, which comprises a mass sufficient to counterbalance the empty bucket and its adjuncts and removable weights to counterbalance a predetermined or fixed load in said bucket. It is these load-counterbalancing weights that are ordinarily manipulated in determining the weight of a partial load, or what is known as the "residue" in the bucket, which residue is not sufficient to make up a complete load.

The auxiliary beam has side branches or arms, as 5, connected by a transverse portion or shaft 6, from which is represented as extending outward an arm 7, connected, as will hereinafter appear, with an automatically-operative balance, which may be of any desirable type, although the balance represented in the drawings is of the spring type. The two arms or branches 5 and the shaft 6 present a substantially U-shaped structure, and the inner ends of the arms bear against brackets, as 8, fastened to the sides of the bucket 2 and located at one side of a vertical line extending centrally of the bucket and intersecting the center of gravity thereof. The connection between the arms 5 and the brackets 8 may be by means of the familiar knife-edge and V-shaped bearings, the knife-edges being mounted upon the said arms 5 and the V-shaped bearings being mounted upon the brackets. The knife-edges are located below the V-shaped bearings.

Upon the inner ends of the complemental arms of the main beam 3 are represented knife-edges 9, which bear against V-shaped bearings carried by the arms 5. The two knife-edges 9 are in transverse alinement with each other, and they are intersected by the central line to which I have previously referred. The fulcrum for the auxiliary beam 4 is upon the bucket and at one side of the center line to which I have referred, while the fulcrum of the main beam is on said center line.

To the bucket 2 I fasten in some suitable way a spring-balance, as 10, connected with the outwardly-extending arm 7 of the auxiliary beam in any desirable way—for example, by means of a chain or equivalent flexible connection 11.

It is believed it will be understood from what has been hereinbefore stated that it is the function of the auxiliary beam 4 and the spring-balance 10 to secure an indication of a fractional part of a load. During the normal operation of the machine or when full loads are being successively weighed and delivered I prefer to throw the auxiliary beam and its immediate accessories out of action, for which purpose any suitable means may be employed. To do this, I have represented a screw, as 12, tapped through the transverse portion of a yoke, as 13, fastened to and rising from the bucket, the auxiliary beam when in action having an up-and-down motion between the sides of the yoke. When it is desired not to use the auxiliary beam, the screw 12 will be run down until it engages the auxiliary beam, the latter, with the main beam, being in the primary position, whereby the said auxiliary beam will be locked against motion when the bucket descends during the making up of a predetermined or fixed load. In this condition the main beam 3 acts in the customary way.

When it is desired to weigh a fractional load, the auxiliary beam 4 is put in action by running up the screw 12. The fractional load, as will be understood, is not of a mass sufficient to effect the operation of the main beam 3. When, however, it is in the bucket, the latter can descend, thereby drawing down upon that part of the auxiliary beam 4 to the left of the central line hereinbefore referred to and elevating that part of the auxiliary beam to the right of said center line, the arm 7 being upon the right of said arm, as will be understood. During the weighing of a fractional load the main beam 3 acts, in effect, as a stationary support for the auxiliary beam. As the arm 7 is elevated on the descent of the bucket during the weighing of a fractional load the spring-balance 10 is operated to indicate the weight of the partial load.

It is not necessary that the main beam 3 directly support the auxiliary beam 4, for in Fig. 3 I show a modification wherein the two beams are linked together, as by links, one of which is shown at 3ª in said figure. These links are vertically disposed and are coincident with the vertical central line of the bucket.

In both forms of the invention which I have described the bucket is carried by the auxiliary beam and the main beam carries the auxiliary beam.

What I claim is—

1. In a weighing-machine, the combination of a bucket, a main beam, an auxiliary beam supported by the main beam, the auxiliary beam supporting the bucket, and automatic indicating means connected with the auxiliary beam.

2. In a weighing-machine, the combination of a bucket, a main beam for the bucket, an auxiliary beam connected with the bucket, means for automatically indicating fractions of a load coöperative directly with the auxiliary beam, and means for locking the auxiliary beam against action at will.

3. In a weighing-machine, the combination of a bucket, main and auxiliary beams connected with the bucket, automatic means for indicating fractions of a load coöperative directly with the auxiliary beam, and means movable with the bucket for throwing the auxiliary beam out of action at will.

4. In a weighing-machine, the combination of a bucket, a main and an auxiliary beam, the auxiliary beam carrying the bucket at one side of the vertical center line of said bucket, and the main beam supporting the auxiliary beam substantially on said line, and means for indicating fractions of a load connected with the auxiliary beam at the opposite side of said line.

5. In a weighing-machine, the combination of a bucket, a main and an auxiliary beam, the auxiliary beam carrying the bucket at one side of the vertical center line of said bucket and the main beam supporting the auxiliary beam substantially on said line, means for indicating fractions of a load connected with the auxiliary beam at the opposite side of said line, a screw located to engage the auxiliary beam to lock it against motion at will, and a carrier device for the screw mounted on the bucket.

6. In a weighing-machine, the combination of a bucket, a main beam and an auxiliary beam, the auxiliary beam carrying the bucket at one side of the vertical center line of said bucket, and the main beam supporting the auxiliary beam substantially on said line, and indicating mechanism connected with the auxiliary beam.

7. In a weighing-machine, the combination of a bucket, a main beam, an auxiliary beam directly carrying the bucket and the main beam carrying the auxiliary beam, and means carried by the bucket for indicating loads connected with the auxiliary beam.

8. In a weighing-machine, the combination of a bucket, a main beam, an auxiliary beam carrying the bucket and the main beam carrying the auxiliary beam, and indicating means carried by the bucket and connected with the auxiliary beam.

9. In a weighing-machine, the combination of a bucket, and main and auxiliary beams, the auxiliary beam carrying the bucket at one side of the vertical center line of said bucket, and the main beam supporting the auxiliary beam substantially on said center line.

In testimony whereof I have hereunto set my hand in presence of two subscribing witnesses.

HENRY RICHARDSON.

Witnesses:
J. A. ROBERTS,
F. H. BAYLEY.